Oct. 27, 1942.  E. BAYER  2,300,093

RECORD PLAYING AUTOMOTIVE HORN

Filed June 24, 1940

Edward Bayer
INVENTOR

BY Carl Miller
ATTORNEY

Patented Oct. 27, 1942

2,300,093

UNITED STATES PATENT OFFICE 2,300,093

RECORD PLAYING AUTOMOTIVE HORN

Edward Bayer, Texarkana, Ark.

Application June 24, 1940, Serial No. 342,123

1 Claim. (Cl. 274—22)

This invention relates to a sound producing and operating mechanism particularly adaptable for use as an automotive horn.

The principal object of this invention is to provide a record playing device electrically connected to a loud speaker so designed as to be mounted within an automobile and operatively under the control of the person driving the automobile; the record used in the record playing device being of the cylindrical type, and said device including mechanism for imparting a quick return of the arm carrying the diaphragm and needle of said device.

Another object of this invention is to provide on the cylindrical record a plurality of spaced sound tracks for producing a plurality of different sound passages as for example a warning sound, a short melody, a slogan or in fact any desired sound, and each adapted to be selectively engaged.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein.

Figure 2:
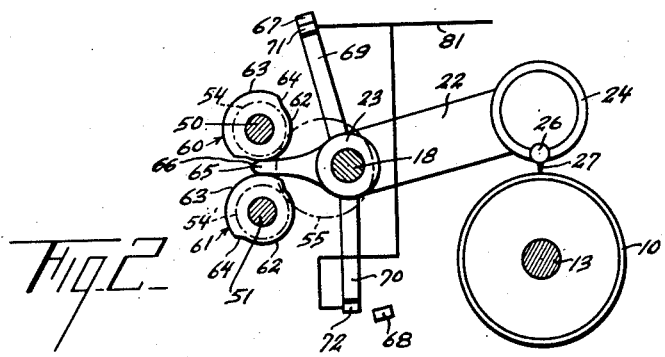
Figure 2 is a section taken on line 2—2, Fig. 1 showing operating cams for the control aim of the record playing device.

Referring to the drawing, 10 denotes a cylindrical record of a type well known mounted on a shaft 11 for rotation therewith, the record shaft 11 being supported intermediate its ends in a bearing 12. The record 10 is detachably mounted on the shaft 11 in any desired manner (not shown) and is supported at its end remote from the bearing 12 on an axially movable stub shaft 13 rotatably supported on a bearing 14 and axially movable therein. A hand wheel 15 is provided on the outer end of the stub shaft 13 to facilitate axial movement thereof into and out of engagement with the record 10.

Adjacent the record 10 there is provided a screw 18 arranged parallel to the axis of rotation of the record 10, one end of said screw being rotatably supported in a bearing 19, the other end of said screw terminating in a shaft portion 20 rotatably mounted inwardly of its end in a bearing 21. A control arm 22 is provided at one end with an internally threaded hub 23, adapted to be mounted on the screw 18 for axial movement thereon between the bearings 19 and 21, the path of movement of the control arm being not less than the length of the record 10. On its other end the control arm 22 carries a diaphragm housing 24 which is provided with a conventional needle support 25, including a clamping screw 26 for clamping a needle 27 therein.

The end portion of the shaft 11 extending beyond the bearing 12 has mounted thereon two axially spaced electro-magnetic clutches 30 and 31, each including, respectively, freely rotatable clutch plates 32 and 32', and slidable clutch plates 33 and 33', keyed to said shaft for rotation therewith. Freely rotatable on the shaft 11 and fixed to the stationary clutch plate 32 is a gear 34, and similarly rotatable freely on the shaft 11 and fixed to the stationary clutch plate 32' is a smaller gear 35. Also fixed to the shaft 11 outwardly of the gear 35 are the gears 36 and 37. An electric motor 38 is provided with a drive gear 39 which meshes with the gear 36 for imparting rotation to the shaft 11. Thus, with one or the other of the electro-magnetic clutches 30 and 31 in closed position as will be hereinafter described, rotation of the shaft 11 by the gear drive 39—36, will rotate one or the other of the gears 34 or 35. Fixedly mounted on the shaft portion 20 of the screw 18 are the gears 40 and 41, the gear 40 meshing directly with the gear 34, while the gear 41 meshes with an idler gear 42 which in turn meshes with the gear 35. With the electro-magnetic clutch 31 closed, the gear train 35, 42, 41 is operative to rotate the screw 18 to impart a forward movement to the record control arm 22. With the electro-magnetic clutch 30 closed, the gear train 34, 40 is operative to rotate the screw 18 in a reverse direction to return the control arm 22 to its initial position. Th gear train 34, 40 is so designed as to provide a quick return of the control arm 22 as compared to its forward movement upon rotation of the screw 18 when the gear train 35, 42, 41 is operative.

Figure 1:
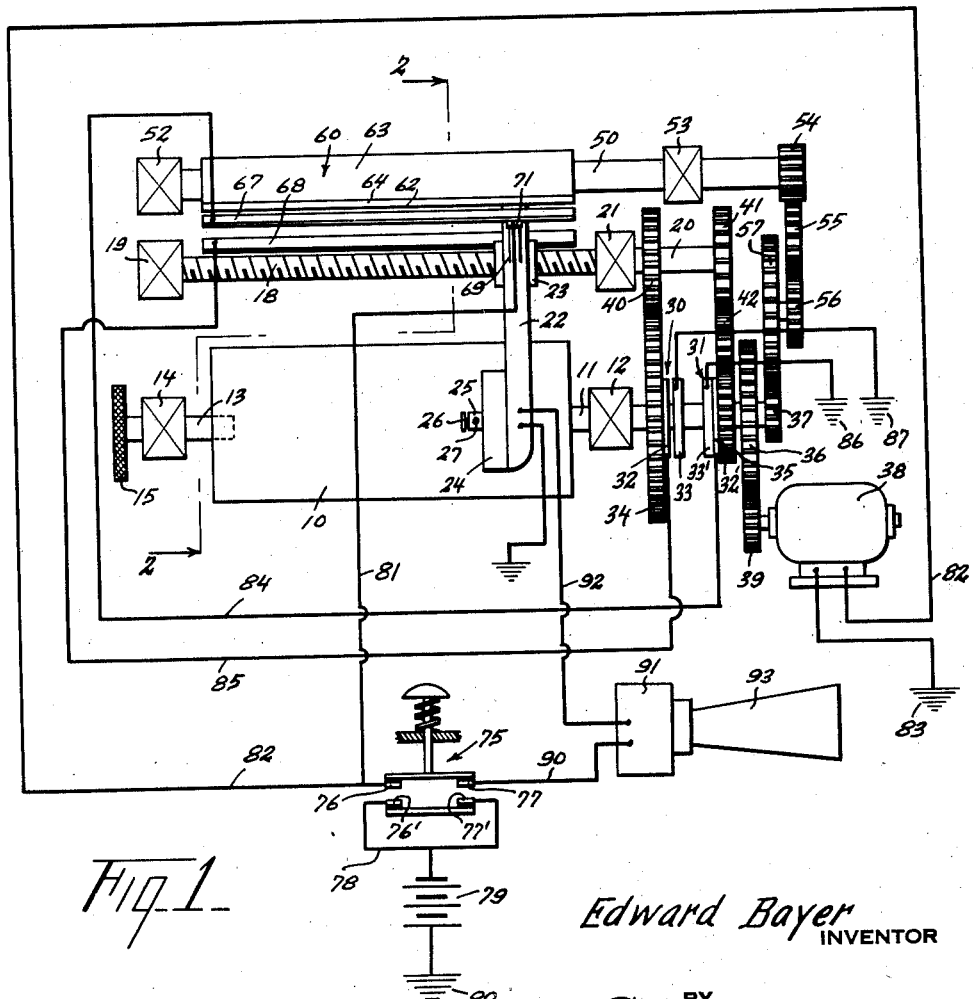
Figure 1 is a diagrammatic view showing record player device, its electrical connections to loud speaker or horn, and operating mechanism.

In order to automatically control the operation of the electro-magnetic clutches 30 and 31 for operating the record 10 and the playing thereof there is provided a pair of vertically spaced cam shafts 50 and 51, see Fig. 2, each rotatably supported at one end respectively in upper and lower bearings 52 (only the upper being shown, Fig. 1) and intermediate its ends, respectively in upper and lower bearings 53 (only the upper being shown, Fig. 1). On the end of each of the cam shafts 50 and 51 projecting beyond the bearings 53 are respectively fixed the gears 54 and 54', both gears being identical in size, and both simultaneously meshing with an idler gear 55. The idler gear 55 in turn meshes with an idler gear 56 which latter is in fixed co-axial relation to an idler gear 57 adapted to mesh with the outermost gear 37 on the record shaft 11. Preferably both idler gears 56 and 57 are fixedly mounted on the same shaft and the idler gear 57 is of a size considerably larger than the idler gear 56 and the gear 37.

Each of the cam shafts 50 and 51 is respectively provided with a cam 60 and 61, of identical shape and size. Thus each cam is defined by a semi-cylindrical surface 62, and a semi-cylindrical surface 63 of a larger diameter, both of said surfaces being joined by a shouldered portion 64. Formed integral with the control arm hub 23 is a follower arm 65, provided with a rounded end 66 lying between the cams and substantially in the vertical plane passing through the axes of the cam shafts 50 and 51. The cams 60 and 61 are of the same length as the length of the record 10 and are positioned on their respective cam shafts such that the semi-cylindrical surface 62 of the cam 60 will engage the upper surface of the cam follower 65 while the semi-cylindrical surface 63 of the cam 61 will engage the lower surface of the cam follower 65 as clearly shown in Fig. 2. Thus, as the screw 18 is rotated the control arm 22 is held against rotation by the follower arm 65, the upper and lower surfaces of which are in engagement with the cam surfaces, the follower arm 65 sliding between said cam surfaces as the control arm 22 is moved forwardly on the screw 18. In the position of the parts shown in Fig. 2 the control arm 22 is in its "down" or operative position. The needle 27 riding in the sound track of the record 10. The gear train 37, 57, 56, 55, 54, 54' is so designed as to impart one-half revolution to each of the cam shafts for a time-interval equal to the time the control arm 22 traverses the length of the record during the playing thereof. The control arm is held in a "down" or playing position during the entire time interval because the semi-cylindrical cam surfaces 62 and 63 are so synchronized and co-related that only at the end of the forward movement of the control arm will the cam surface 63 of the upper cam 60 and the cam surface 62 of the lower cam 61 come together in operative relation to the cam follower 65 so as to cause and permit the cam follower 65 to move down and to swing the control arm 22 about the axis of the screw 18 as a fulcrum in a direction away from the surface of the record to thereby raise the needle 27 from the sound track.

Arranged above and below the screw 18 and parallel thereto are contact bars each of a length equal to the length of the record 10. Fixed to the hub 23 of the control arm are upper and lower contact arms 69 and 70, at the ends of which are respectively attached contact plates 71 and 72. The relative positions of the contact arms 69, 70 and contact bars 67, 68 is such that when the upper contact bar 67 is engaged by the contact plate 71 of the upper contact arm 69, the lower contact bar 68 and contact plate 72 of the lower contact arm 70 are out of engagement, and vice versa. The contact plates slidably engage their respective contact bars alternately for the entire movement of the control arm 22 on the screw 18, first during forward movement and then during reverse movement thereon.

Suitably mounted on the dash or steering wheel is a switch 75 including two pairs of opposed contacts 76, 76' and 77, 77'. A conductor 78 connects the contacts 76', 77' to one terminal of a battery 79, the other battery terminal being grounded as at 80 in the manner well known. Connecting the upper and lower contact plates 71 and 72 to the switch contact 76 is a conductor 81, and in the same line is a conductor 82 connected to one terminal of the electric motor 38. The other motor terminal is grounded as at 83. The upper contact bar 67 is connected by a conductor 84 to the clutch plate 32' of the electro-magnetic clutch 31, while the lower contact bar 68 is connected by a conductor 85 to the clutch plate 32 of the electro-magnetic clutch. The other clutch plates 33 and 33' are respectively grounded as at 86 and 87. From the switch contact 77 there is a conductor 90 to the amplifier 91 and a conductor 92 connects the diaphram housing 24 to said amplifier. The amplifier 91 has a built-in horn 93, the details of construction of both the amplifier and horn forming no part of this invention.

In the relative position of parts shown in Fig. 1, assuming the switch 75 closed for starting the motor 38, at the same time the engagement of the contact plate 71 with the contact bar 67 closes the electro-magnetic clutch 31 whereby power of the motor 38 is transmitted through the gear train 35, 42, 41 to turn the screw 18 causing forward movement of the control arm carrying the needle 27. Also at the same time the amplifier 91 is turned on and the record 10 rotated so that there is emitted from the horn 93 the sound recorded on the record. When the control arm completes its forward movement the cams 60 and 61 cause the control arm to swing counter-clockwise, see Fig. 2, which movement breaks the engagement of the contact plate 71 with contact bar 67 and brings into engagement contact plate 72 and contact bar 68 so as to close the electro-magnetic clutch 30 and open electro-magnetic clutch 31 for causing the gear train 34, 40 to operate to turn the screw 18 in a reverse direction whereby to move the control arm 22 back to its initial position. When the second half-revolution of the cams 60 and 61 is completed the control arm 22 is lowered into operative position.

In order to provide for a lowering of the control arm 22 immediately when it is brought back to its initial position, if such be desired, the circumferential extent of the upper cam surface 63 and the circumferential extent of the lower cam surface 62 may be decreased like amounts so that the time interval of engagement of said reduced cam surfaces with the cam follower 65 is equal to the time taken for the return of the control arm to its initial position.

It is desired to be understood that any form of sound may be recorded on the record 10, which may take the form of a warning sound, a melody, a slogan, etc.

Having thus described the invention, I claim as new and desire to secure by Letters Patent:

A device of the character described comprising a cylindrical sound record, a shaft mounting the same for rotative movement therewith, an electric motor, a gear drive connecting said motor to said shaft, a control arm carrying a diaphragm and needle for movement on the sound track of said record, a screw parallel to said shaft supporting said control arm and operative to move the same to its initial position, a pair of gear drives connecting said shaft and screw, one arranged to rotate said screw in one direction and the other to rotate said screw in a reverse direction, an electro-magnetic clutch for each of said pair of gear drives mounted on said shaft operative when alternatively closed to transmit the drive from said shaft to said screw for either forward or reverse rotation thereof, a pair of cam means, a cam follower on said control arm engaging said cam means, a gear drive connecting said cam means with said shaft, a pair of contact arms on said control arm, a pair of contact bars each adapted to be engaged by its complemental contact arm when the other contact bar is disengaged from its complemental contact arm alternately, said contact arms and contact bars being electrically connected to an electro-magnetic clutch and said cam means being operative to elevate said control arm to disengage the needle from the record upon completion of its forward movement on said screw whereby to move said contact arms and contact bars into and out of engagement to respectively close and open the electro-magnetic clutches so as to render the forward gear drive inoperative and the reversing gear drive operative to move said control arm in a reverse direction on said screw back to its initial operative position with relation to said record.

EDWARD BAYER.